United States Patent [19]

Christiansen et al.

[11] 4,247,956
[45] Jan. 27, 1981

[54] INSTALLATION FOR THE MONITORING OF MESSAGE TRANSMISSION SYSTEMS WITH LIGHTWAVE CONDUCTORS

[75] Inventors: Hans Christiansen; Ewald Braun, both of Munich, Fed. Rep. of Germany

[73] Assignee: Siemens Aktiengesellschaft, Berlin & Munich, Fed. Rep. of Germany

[21] Appl. No.: 961,750

[22] Filed: Nov. 17, 1978

[30] Foreign Application Priority Data

Nov. 18, 1977 [DE] Fed. Rep. of Germany ....... 2751645

[51] Int. Cl.³ .................. H04B 9/00; G01N 21/00; G02B 5/14
[52] U.S. Cl. ................... 455/606; 455/610; 356/239; 356/5; 356/237; 350/96 C; 250/227
[58] Field of Search ................ 250/199, 227, 572; 356/239, 237, 5, 73.1; 350/96 C, 96.1; 455/606, 610, 612

[56] References Cited

U.S. PATENT DOCUMENTS 3,981,592  9/1976  Williams ........................... 250/199

Primary Examiner—Robert L. Griffin
Assistant Examiner—Edward L. Coles
Attorney, Agent, or Firm—Hill, Van Santen, Steadman, Chiara & Simpson

[57] ABSTRACT

In the transmission of messages on lightwave conductors, upon the rupture of such lightwave conductors, dangerous rays can occur that cause eye damage. Therefore, an installation is proposed that, upon the rupture of a lightwave conductor, communicates this rupture to the transmitting station via an auxiliary or return line. This communication causes the transmitter to transmit only pulsed messages in the direction of the rupture location, so that the radiation occurring is harmless. Further, the installation sees to it that upon reception of the pulsed message in the receiver following the rupture location, a return notice is transmitted to the transmitter concerned, so that the transmitter is caused to again switch the full signal output through.

4 Claims, 2 Drawing Figures

INSTALLATION FOR THE MONITORING OF MESSAGE TRANSMISSION SYSTEMS WITH LIGHTWAVE CONDUCTORS

BACKGROUND OF THE INVENTION

The invention relates to an installation for the monitoring of message transmission systems with lightwave conductors with mutually directed message flow in the form of a four-wire transmission.

In message transmission on lightwave conductors, particularly with the use of laser transmitters, retinal damage can occur in observing the lightwave conductor ends. This can occur, for example, in that the end of a torn lightwave conductor cable is found by a non-expert and is investigated by him. The intensive light beam flowing from the lightwave conductor end, which is, however, usually invisible since it is infrared, can then cause damage to the eye.

SUMMARY OF THE INVENTION

The object of the invention is to specify an arrangement for this condition that carries out an automatic monitoring of the lines and eliminates the aforementioned dangers.

This object is inventively achieved in an installation of the type initially cited, in that, upon failure of a transmission line and occasioned by the receiver lying respectively behind (beyond) the failure, a reduction of the transmission output in the direction of the interruption ensues to such a degree, that an endangerment by means of radiation at the light conductor rupture is avoided.

To reduce the transmission output, pulsed carrier signals with a small pulse/pause ratio and a repeat frequency in the low frequency range of about 50 to 1000 Hz are advantageously emitted from the appropriate sender in the interference direction.

It is further advantageous to use two different pulse rhythms and, indeed, of such a type that the one rhythm is transmitted proceeding from the receiver (B) located after the non-functioning line of the appropriate transmitter in the opposing direction instead of the signal, and is received by the receiver there at the other end (A) and that the second pulse rhythm is given onto the disturbed line by the sender there at the other end (A), which second pulse rhythm is received by the first-mentioned receiver when the line is again intact and causes the appropriate transmitter to again transmit the message signal, whereupon the message signal is likewise again sent at the station located in front of the disturbed location.

In the following, the invention is explained in greater detail on the basis of the accompanying sheets of drawings; and other objects, features and advantages will be apparent from this detailed disclosure and from the appended claims.

DETAILED DESCRIPTION

Figure 1:
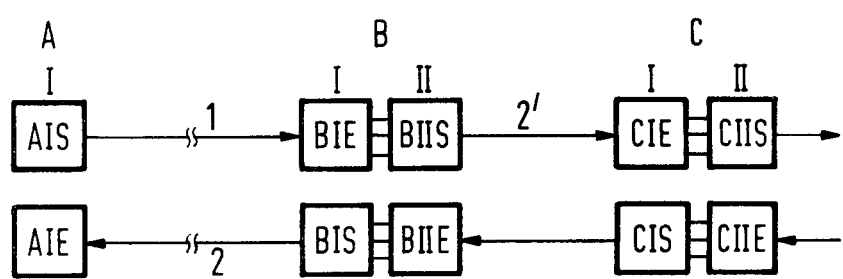
FIG. 1 is a diagrammatic view of a message transmission installation that operates with lightwaves.

FIG. 1 shows the diagram of a message transmission installation that works with lightwaves, for example, with laser beams. Thereby, A indicates the end station of the transmission installation, while B and C are intermediate stations, i.e., so-called relay stations. Transmission ensues in both directions, in accord with a four-wire process. This is a prerequisite for the process detailed in the following. The addition S to the designations AI, BI, CI, BII and CII at the individual stations indicates, in each case, the transmitter, while the addition E to these designations represents the appropriate receiver of the respective station A, B or C. The message transmission conductors (or lines) are designated by 1, 2 and 2'. These are designed as light conductors and the interruption location in lines 1 and 2 are marked in FIG. 1 by means of a gap in each line with a drawn out S at each side of the gap. In case no retrochannel, as in usual in a four-wire line, is present, then an additional, for example, radio link channel, or some other message line must be present.

For the actual protection, it is sufficient, upon non-reception of the signal, to also switch off the transmission in the opposing direction or in the retrochannel, respectively. This, too, then effects the suppression of the transmission of the signal in the appropriate counter-direction—which is then the direction in which the interruption has occurred. Thereby, the entire line is free of signals and the desired protection has been achieved. The disadvantage in this simple process is the time-consuming and troublesome turning-on procedure. The end locations must be informed concerning the fiber repair (splicing) which normally demands considerable time. An automatic turning-on, which nonetheless offers the full protection, is therefore better. To that end, the counter-direction is not completely shut down, but, rather, a replacement signal whose continuous duty is so small that it is harmless is sent over the line. But since both fibers could be disturbed - for example in the case of a cable rupture—two different replacement signals are even required. A pulse with a very low repetition rate which is different for the two replacement signals, for example 100 Hz for the replacement signal number 1 and 200 Hz for the replacement signal number 2, and a short pulse duration of, for example, 1 $\mu$s is proposed as the replacement signal. In this example, the effective output is smaller by a factor of 5000 or 2500, respectively, than that of a digital signal with the same zero-one distribution.

The basic principle of the procedures upon interruption and re-turning-on derives from the determination that, upon no reception of a signal in the counter-direction, the message transmission is interrupted and in its place the replacement signal number 1 is transmitted. When, after completion of repairs, the replacement signal (e.g. number 1) is again received, then this triggers the replacement signal number 2 in the counter-direction and the reception of the replacement signal number 2 effects the release of the counter-direction for the message transmission.

The reception of the message signal then releases the counter-direction for the corresponding message signal. Thereby, the entire connection is then again switched on.

The temporal course of the shutting down and reactivating of the line for the disturbance cases mentioned above is illustrated in Tables 1 and 2.

The numerical sequence of the numbers in parenthesis in the Tables reproduces the temporal course within a time span. In Table 1, the disturbance of the fiber from A or B is first indicated at BIE "No Sig E". This first occurrence is thus designated with (1.). This missing signal triggers a replacement pulse of frequency f1 sent from sender BIS to receiver AIE; therefore the appropriate number (2) in Table 1. At the same time, the replacement pulse is transmitted from BIIS to C. This replacement pulse on line 2' must be transmitted as a message replacement for the missing message signal of BIE, so as to prevent the simulation of a line failure on the line 2'. This occurrence is a parallel occurrence to occurrence (2.), transmission from BIS.

In table 2, no signal is received at two locations.

TABLE 1

Case 1

| Place | | Occurrences | | |
|---|---|---|---|---|
| AIS | Mess S | Replacement Pulse f2 (4.) Transmission | Message Signal (8) Transmission | |
| AIE | Mess E | Replacement Pulse f1 (3.) Received | Message Signal (7.) Received | |
| BIE | Mess E | No Signal (1.) Received | Replacement Pulse f2 (5.) Received | Message Signal (9.) Received |
| BIS | Mess S | Replacement Pulse f1 (2.) Transmission | Message Signal (6.) Transmission | |
| BIIS | Mess S | Replacement Pulse f2 (2.) Transmission | | Message Signal (10.) Transmission |
| BIIE | Mess E | | | |
| | $t_1$ | | $t_2$ | $\rightarrow t$ |

In the Tables, the parenthetical values indicate the successive occurrences (e.g. 1 through 10 in Table 1). "Mess" in column 2 of the Tables in each case means message, an "S" indicating transmission of the message and an "E" indicating receipt of the message.

Case 1: The lightwave conductor 1 going from A to B is interrupted (interruption of line 1 only) at time $t_1$; at time $t_2$ the lightwave conductor 1 is again connected-through (interruption cleared away). There is no interruption in line 2.

TABLE 2

Case 2

| Place | | Occurrences | | | |
|---|---|---|---|---|---|
| AIS | Mess S | Replacement Pulse f1(2.) Transmission | | Mess(6.) S | |
| AIE | Mess E | No Signal Received(1.) | | Replacement Pulse f2(5.) Received | Mess E (9.) |
| BIE | Mess E | No Signal Received(1.) | Replacement Pulse f1(3.) Received | Mess(7.) E | |
| BIS | Mess S | Replacement Pulse f1(2·) Transmission | Replacement Pulse f2(4.) Transmission | Mess(8.) S | |
| BIIS | Mess S | Replacement Pulse f2(2.) Transmission | | Mess(8.) S | |
| BIIE | Mess E | | | | |
| | $t_1$ | | $t_2$ | | $t_3$ |

Case 2: Both lightwave conductors 1 and 2 between A and B are interrupted (as actually shown in FIG. 1) at time $t_1$ (interruption of both lines 1+2). At time $t_2$, interruption 1 is cleared away. At time $t_3$, interruption of line 2 is cleared away.

| Key: | Message signal received | Mess E |
|---|---|---|
| | Message signal transmitting | Mess S |
| | Replacement pulse signal 1 of repetition frequency f1 | Replacement Pulse f1 |
| | Replacement pulse signal 2 of repetition frequency f2 | Replacement Pulse f2 |

The double indication (2.) in Table 1, for example, means that the signal transmission from BIS and BIIS ensues simultaneously. By analogy, this is valid for all multiple indications.

The circuitry for the replacement pulse trains required is simple, for only a minimal frequency precision is required.

In the receiver, the message signal can be simply differentiated from the replacement pulses and the absence of a message signal sensed with two point rectifiers of differing time constants. The very different frequencies of the replacement pulses can be easily recognized and evaluated by means of simple tuned circuits.

Figure 2:
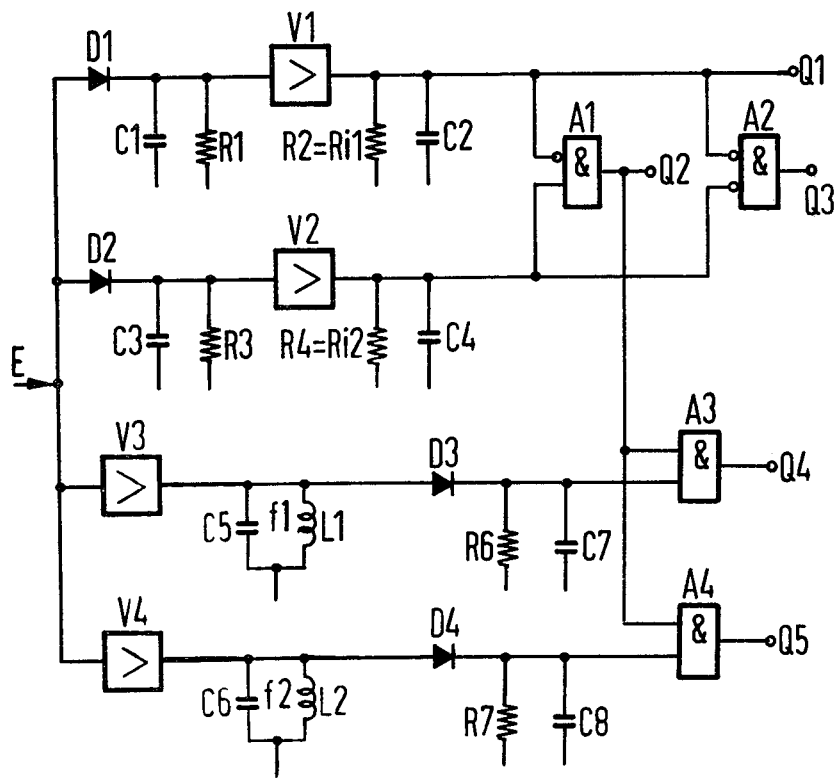
FIG. 2 is a circuit diagram showing an exemplary embodiment of a circuit for the recognition of signal interruption and for the recognition of replacement pulses generated in accordance with the teachings of the invention.

An example for a circuit for the recognition of the signal interruption and for the recognition of the two replacement pulse trains that have different frequencies is shown in FIG. 2. This circuit lies at the output of the receivers in each of the intermediate stations, e.g. AIE, BIE, BIIE, CIE, CIIE, etc.

The upper part of the circuit, with two point rectifiers formed by means of D1, C1, R1 and D2, C3, R3, serves in essence for the recognition of whether a message signal or a replacement pulse train for it are present or none of the two. Thereby, $C1 \cdot R1 = T1$, $C2 \cdot R2 = T2$, $C3 \cdot R3 = T3$, $R4 \cdot C4 = T4$ and the following is valid, $T2 >> T3 >> T1$, whereby $T2 \approx T4$. Thereby, the time constant T1 is selected about five times as large as the bit interval of the message signals. The uppermost branch with T1, thus, recognizes the message signal, the further branch with T3 recognizes the replacement pulses. The amplifiers V1 and V2 with members R2, C2 and R4, C4 connected on their output side serve the smoothing of the signals in the two branches and the succeeding RC-networks, i.e. R2, C2 and R4, C4, therefore have a higher time constant than the preconnected C1, R1 and C3, R3. These time constants are determined in essence by the input resistors Ri, which is why they have been referred to in the drawing. The two signals in the upper branches are supplied to an AND gate A1 with a negated input. At the output Q2 of this gate, thus, a logical one signal only appears when the replacement pulse arriving via V2 is present but the message signal arriving via V1 is not present. At the output Q1 of the uppermost branch, of course, a signal only arises when the message signal is present. The gate A2 is a NAND gate, so that a signal arises at its output Q3 only when both signals arriving from V1 and V2 are not present, i.e. that neither the message signal nor the replacement pulse exists. In the two lower branches, which are connected in parallel to input E, isolating amplifiers V3 and V4 are first provided. These two branches serve for the recognition of the very different frequencies of the replacement pulses, for example, 100 Hz for the replacement pulse train f1 and 200 Hz for the replacement pulse train f2. For the separation according to frequency, tuned circuits C5, L1 and C6, L2 are connected on the output side of the amplifiers. The resonant frequency of the first-mentioned tuned circuit is f1, that of the second-mentioned is f2. Following the two tuned circuits are point rectifiers with diodes D3, D4 and, connected on their output side, RC-networks R6, C7 and R7, C8. Thereby, $R6 \cdot C7 = T5$, $R7 \cdot C8 = T6$, whereby $T5 \approx T6 \approx T2 \approx T4$. Since these two branches only serve for the discrimination of the two replacement pulse sequence frequencies, their respective time constants are thus very large in comparison to T1. Connected on the output sides of these branches are the respective AND gates A3 and A4. In and for themselves, the two branches V3 and V4 alone would suffice to recognize whether replacement signals are present or not. Since, however, under certain conditions, frequency components could also occur in the transmitted message signal which would trigger one or both of the oscillating circuits, thus for the sake of security the logic elements A3 and A4 are provided. When in any case the criterion Q2—i.e. replacement signal present——and one of the two signals coming from V3 or V4, respectively, is present at the input of gate A3 or A4, then the gate switches through and the respective characterizing signal for the replacement pulse received appears at output Q4 and Q5. Q4 thus characterizes the frequency f1 and Q5 the presence of frequency f2.

In this manner, it is easy to distinguish the criteria initially cited from one another. On the transmission side, a pulse generator which can deliver the repetition rate f1 and f2 is present for the transmission of the replacement pulses. Such installations are sufficiently known, so that an example here is not necessary. Whether a replacement pulse and which replacement pulse is to be sent out in any given case derives from Tables 1 and 2. The criteria signals for controlling the associated transmitter pulse generators and message circuits are supplied by the receiver circuit described on the basis of FIG. 2.

It will be apparent that many modifications and variations may be effected without departing from the scope of the novel concepts and teachings of the present invention.

We claim as our invention:

1. A method of monitoring a message transmission system with lightwave conductors and comprising a preceding station and a following station having a first transmission link for message transmission from the preceding station to the following station and having a second transmission link for transmission from the following station to the preceding station, said method comprising:
    (a) monitoring at the preceding station (A) and at the following station (B) for receipt via the second transmission link and via the first transmission link, respectively, of
        (1) a communication signal,
        (2) a first replacement signal with radiation density not damaging to the eyes and readily distinguishable from a communication signal, and
        (3) a second replacement signal with radiation density not damaging to the eyes and readily distinguishable from the communication signal and from the first replacement signal,
    (b) responding at the following station (B) to the lack of receipt of the communication signal via the first transmission link to transmit said first replacement signal with said radiation density not damaging to the eyes via said second transmission link toward said preceding station,
    (c) responding at the preceding station (A) to receipt of said first replacement signal via said second transmission link from said following station to transmit via the first transmission link said second replacement signal with radiation density not damaging to the eyes,
    (d) responding at the following station (B) to the receipt of said second replacement signal from said preceding station (A) upon restoration of said first transmission link to interrupt the transmission of the first replacement signal via said second transmission link and to resume the transmission of a communication signal via said second transmission link to said preceding station (A), and
    (e) responding at the preceding station (A) to the receipt of the communication signal via said second transmission link to resume transmission of a communication signal via the first transmission link to said following station (B).

2. A method according to claim 1, further comprising responding at the preceding station (A) to the lack of receipt of a communication signal via said second transmission link, in the absence of receipt of the first replacement signal from said following station (B), to transmit said first replacement signal with radiation density not damaging to the eyes via said first transmission link toward said following station (B), responding at the following station (B) to receipt of said first replacement signal via said first transmission link from said preceding station (A) to transmit via the second transmission link said second replacement signal with radiation density not damaging to the eyes and readily distinguishable from said first replacement signal, responding at the preceding station (A) to the receipt of said second replacement signal from said following station (B) to interrupt the transmission of the first replacement signal and to resume the transmission of a communication signal via said first transmission link to said following station (B), and responding at the following station (B) to the receipt of the communication signal via said first transmission link to resume transmission of a communication signal via the second transmission link to said preceding station (A).

3. A method according to claim 1 wherein each station is responsive to first and second replacement signals in the form of pulsed carrier signals with a small pulse/pause ratio such that radiation density is not damaging to the eyes and with respective readily distinguishable repetition frequencies in a low frequency range of about 50 through 1000 Hz.

4. A method according to claim 3, wherein the transmission system includes a third station (C) after the following station (B), said method further comprising responding at the following station (B) to the lack of receipt of the communication signal via the first transmission link to transmit said second replacement signal toward said third station for the duration of the interruption.

* * * * *